United States Patent
Anchi et al.

(10) Patent No.: US 12,010,172 B2
(45) Date of Patent: Jun. 11, 2024

(54) HOST DEVICE WITH MULTI-PATH LAYER CONFIGURED FOR IO CONTROL USING DETECTED STORAGE PORT RESOURCE AVAILABILITY

(71) Applicant: EMC IP Holding Company LLC, Hopkinton, MA (US)

(72) Inventors: Amit Pundalik Anchi, Bangalore (IN); Rimpesh Patel, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 432 days.

(21) Appl. No.: 16/587,536

(22) Filed: Sep. 30, 2019

(65) Prior Publication Data

US 2021/0099520 A1   Apr. 1, 2021

(51) Int. Cl.
*H04L 67/1097* (2022.01)
*G06F 13/10* (2006.01)
*H04L 43/0805* (2022.01)
*H04L 67/141* (2022.01)

(52) U.S. Cl.
CPC ........ *H04L 67/1097* (2013.01); *G06F 13/102* (2013.01); *H04L 43/0805* (2013.01); *H04L 67/141* (2013.01)

(58) Field of Classification Search
CPC .............. H04L 67/1097; H04L 67/141; H04L 43/0805; G06F 13/102
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,904,681 B1 | 3/2011 | Bappe et al. |
| 7,925,872 B2 | 4/2011 | Lai et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Joon H Hwang
*Assistant Examiner* — Jaren Means
(74) *Attorney, Agent, or Firm* — Ryan, Mason & Lewis, LLP

(57) ABSTRACT

A host device is configured to communicate over a network with a storage system comprising a plurality of storage devices. The host device comprises a multi-path input-output (MPIO) driver configured to control delivery of input-output (IO) operations from the host device to ports of the storage system over selected ones of a plurality of paths through the network. The MPIO driver of the host device is further configured, for each of at least a subset of the ports, to obtain from the storage system information characterizing a current number of host devices connected to the port and a current available capacity measure of the port, and to limit an amount of the IO operations that are delivered over one or more of the paths to the port based at least in part on the obtained information.

20 Claims, 4 Drawing Sheets

(56) References Cited

U.S. PATENT DOCUMENTS

| | | | |
|---|---|---|---|
| 8,825,919 | B1 | 9/2014 | Lim et al. |
| 8,874,746 | B1 | 10/2014 | Gonzalez |
| 9,026,694 | B1* | 5/2015 | Davidson .............. G06F 9/5083 710/38 |
| 9,400,611 | B1 | 7/2016 | Raizen |
| 9,594,780 | B1 | 3/2017 | Esposito et al. |
| 9,778,852 | B1 | 10/2017 | Marshak et al. |
| 10,320,691 | B1* | 6/2019 | Matthews ............... H04L 45/24 |
| 10,353,714 | B1 | 7/2019 | Gokam et al. |
| 2004/0010563 | A1 | 1/2004 | Forte et al. |
| 2005/0108444 | A1* | 5/2005 | Flauaus ............... H04L 41/0894 710/15 |
| 2006/0277383 | A1 | 12/2006 | Hayden et al. |
| 2008/0043973 | A1 | 2/2008 | Lai et al. |
| 2008/0250178 | A1* | 10/2008 | Haustein ................ H04L 47/10 710/107 |
| 2009/0089462 | A1* | 4/2009 | Strutt .................... G06F 3/0607 710/16 |
| 2009/0259749 | A1* | 10/2009 | Barrett ............... H04L 41/0631 709/224 |
| 2011/0197027 | A1 | 8/2011 | Balasubramanian et al. |
| 2011/0296230 | A1 | 12/2011 | Chen et al. |
| 2015/0222705 | A1 | 8/2015 | Stephens |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |
| 2019/0155532 | A1* | 5/2019 | Takakura ............ G06F 11/3433 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al., filed Dec. 21, 2017 and entitled "Storage System with Input-Output Performance Control Utilizing Application Process Detection."

U.S. Appl. No. 15/795,653 filed in the name of Maneesh Pusalkar et al., filed Oct. 27, 2017 and entitled "Storage System with Network-Wide Configurable Device Names."

U.S. Appl. No. 16/142,274 filed in the name of Sanjib Mallick et al., filed Sep. 26, 2018 and entitled "Host Device with Multi-Path Layer Implementing Automatic Standby Setting for Active-Active Configuration."

* cited by examiner

FIG. 4

PER-PORT AVAILABILITY INFORMATION MAINTAINED BY STORAGE ARRAY — 400

| PORT 1 IDENTIFIER | NUMBER OF CONNECTED HOSTS | AVAILABLE IOPS |
| --- | --- | --- |
| PORT 2 IDENTIFIER | NUMBER OF CONNECTED HOSTS | AVAILABLE IOPS |
| ... | ... | ... |
| PORT K IDENTIFIER | NUMBER OF CONNECTED HOSTS | AVAILABLE IOPS |

HOST DEVICE WITH MULTI-PATH LAYER CONFIGURED FOR IO CONTROL USING DETECTED STORAGE PORT RESOURCE AVAILABILITY

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to storage ports of the storage system. The storage ports are typically limited in number and each has limited resources for handling IO operations received from the host devices. Different ones of the host devices can run different applications with widely varying workloads and associated IO patterns. Such host devices also generate additional IO operations in performing various data services such as replication and migration so as to meet business continuity requirements. As a result, it is not uncommon for certain storage ports to periodically experience unexpected and potentially extreme spikes in received IO operations, also referred to herein as TO bursts. Such IO bursts generated by one or more host devices sharing a storage system can not only cause significant performance degradations in the storage system, but can also adversely impact important functions of the host devices such as load balancing and failover policy execution.

SUMMARY

Illustrative embodiments configure a multi-path layer of one or more host devices to include functionality for IO control using detected storage port resource availability in conjunction with communication with a storage array or other type of storage system via a storage area network (SAN) or other type of network. The multi-path layer illustratively comprises at least one multi-path input-output (MPIO) driver configured to process IO operations of at least one host device. Configuring MPIO drivers of multiple host devices sharing a storage system to implement IO control using detected storage port resource availability advantageously avoids IO bursts, and allows the host devices to provide improved load balancing and failover policy execution, leading to enhanced overall performance.

In one embodiment, an apparatus comprises a host device configured to communicate over a network with a storage system comprising a plurality of storage devices. The host device comprises an MPIO driver configured to control delivery of IO operations from the host device to ports of the storage system over selected ones of a plurality of paths through the network. The MPIO driver of the host device is further configured, for each of at least a subset of the ports, to obtain from the storage system information characterizing a current number of host devices connected to the port and a current available capacity measure of the port, and to limit an amount of the IO operations that are delivered over one or more of the paths to the port based at least in part on the obtained information.

The current available capacity measure of the port illustratively comprises additional IO operations per second (IOPS) supportable by the port beyond actual TOPS already being supported by the port, although it is to be appreciated that numerous other current available capacity measures can be used in other embodiments. The current available capacity measure of the port may be dynamically determined by the storage system based at least in part on actual processing of IO operations arriving at that port.

The information characterizing a current number of host devices connected to the port and a current available capacity measure of the port is illustratively obtained by the host device from the storage system utilizing at least one of an in-band communication mechanism in which one or more commands in a designated storage protocol are sent from the host device to the storage system, and an out-of-band communication mechanism in which host management software of the host device communicates with storage system management software of the storage system over an Internet Protocol (IP) network connection.

In some embodiments, obtaining from the storage system information characterizing a current number of host devices connected to the port and a current available capacity measure of the port comprises establishing a first time period, and repeating the obtaining in each of a plurality of successive instances of the first time period so as to repeatedly obtain from the storage system for each such instance the information characterizing a current number of host devices connected to the port and a current available capacity measure of the port.

Additionally or alternatively, limiting an amount of the IO operations that are delivered over one or more of the paths to the port based at least in part on the obtained information in some embodiments more particularly comprises computing effective permissible IOPS for the port based at least in part on the current number of host devices connected to the port and the current available capacity measure of the port, and limiting the amount of the IO operations that are delivered over one or more of the paths to the port based at least in part on the effective permissible IOPS for the port.

In some embodiments, an MPIO driver is configured to throttle application IOs when permissible limits on all available ports reach an upper threshold, thereby avoiding IO bursts that might otherwise occur in that situation.

Additionally or alternatively, the frequency at which per-port availability information or other similar types of information is obtained from a storage system can also be fine-tuned based on a threshold reported from the storage system. For example, a periodic frequency can be increased so as to ensure that the obtained information is more deterministic of available port resources.

A wide variety of other per-port IO operation limiting arrangements can be implemented using the obtained information. As indicated above, such arrangements can advantageously avoid IO bursts, leading to improved performance.

These and other illustrative embodiments include, without limitation, apparatus, systems, methods and computer program products comprising processor-readable storage media.

BRIEF DESCRIPTION OF THE DRAWINGS

FIG. 4 shows an example of storage port resource availability information maintained by a storage system that can be detected by a host device in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
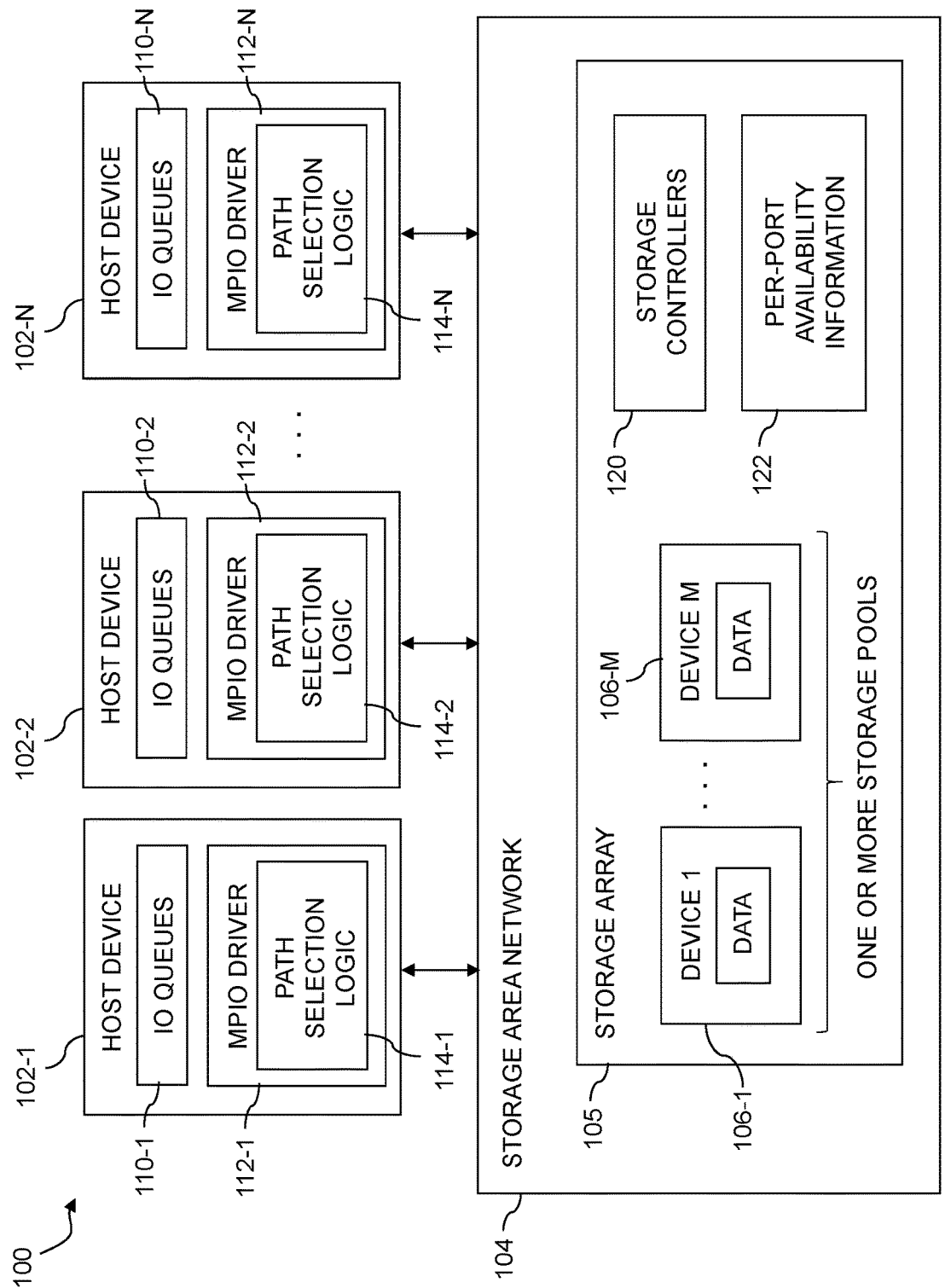
FIG. 1 is a block diagram of an information processing system configured with functionality for IO control using detected storage port resource availability in a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for IO control using detected storage port resource availability. Such functionality is provided at least in part using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for IO control using detected storage port resource availability. Other types of MPIO drivers from other driver vendors may be suitably modified to incorporate functionality for IO control using detected storage port resource availability as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured, for at least a subset of the ports of the storage array 105, to obtain from the storage array 105 information characterizing a current number of host devices 102 connected to the port and a current available capacity measure of the port, and to limit an amount of the IO operations that are delivered over one or more of the paths to the port based at least in part on the obtained information.

Additional examples of IO control using detected storage port resource availability are described below in conjunction with the embodiments of FIGS. 2 through 4.

In the FIG. 1 embodiment, the storage array 105 comprises a plurality of storage controllers 120 and one or more instances of per-port availability information 122. A more detailed example of the per-port availability information 122 will be described below in conjunction with the embodiment of FIG. 4.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, the information obtained by the MPIO driver 112-1 from the storage array 105 comprises information characterizing a current number of host devices 102 connected to the port and a current available capacity measure of the port. Similar information is obtained by the MPIO driver 112-1 for each of the other ports of the storage array 105 that are part of one or more paths over which the MPIO driver 112-1 controls delivery of IO operations to the storage array 105. Such information is illustratively referred to in the context of some embodiments herein as "per-port availability information," although other types of information can be used in other embodiments.

The current available capacity measure of the port illustratively comprises additional IOPS supportable by the port beyond actual TOPS already being supported by the port. Other current available capacity measures can be used in other embodiments. The current available capacity measure of the port can be dynamically determined by the storage array 105 based at least in part on actual processing of IO operations arriving at that port.

The above-noted per-port availability information is illustratively obtained by the MPIO driver 112-1 and stored in one or more data structures of a kernel-space portion of the MPIO driver 112-1. The kernel-space portion of the MPIO driver 112-1 is illustratively part of an operating system of the host device 102-1. Alternatively, other components of the host device 102-1 can be involved in storage of the per-port availability information for the storage array 105, possibly using other types of data structures or storage arrangements.

The information can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, the information can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection.

In some embodiments, in obtaining from the storage array 105 the information characterizing, for a given one of the ports, a current number of host devices 102 connected to the port and a current available capacity measure of the port, the MPIO driver 112-1 establishes a first time period, and repeats the obtaining operation in each of a plurality of successive instances of the first time period. The MPIO driver 112-1 repeatedly obtains from the storage array 105 for each such instance the information characterizing a current number of host devices connected to the port and a current available capacity measure of the port. Similar operations are performed by the MPIO driver 112-1 to obtain similar information for each of a plurality of other ones of the ports of the storage array 105.

The MPIO driver 112-1 is illustratively configured to limit an amount of the IO operations that are delivered over one or more of the paths to the port based at least in part on the obtained information by computing effective permissible IOPS for the port based at least in part on the current number of host devices connected to the port and the current available capacity measure of the port, and limiting the amount of the IO operations that are delivered over one or more of the paths to the port based at least in part on the effective permissible IOPS for the port. The effective permissible IOPS for the port can be computed, for example, as a function of a rate-limiting factor of the host device 102-1 and a ratio of the current available capacity measure of the port and the current number of host devices 102 connected to the port. Different rate-limiting factors may be utilized by different ones of the host devices 102 in computing their respective effective permissible IOPS for the port.

Additionally or alternatively, the MPIO driver 112-1 in limiting an amount of the IO operations that are delivered over one or more of the paths to the port based at least in part on the obtained information establishes a second time period having a duration less than that of the first time period, computes actual IOPS for the port for a given instance of the second time period, compares the actual TOPS for the port to effective permissible IOPS for the port computed using the obtained information for a corresponding instance of the first time period, and limits the amount of the IO operations that are delivered over one or more of the paths to the port based at least in part on a result of the comparing.

The first time period illustratively has a duration that is an integer multiple of the duration of the second time period. The duration of the second time period may be reduced responsive to the actual IOPS for the port reaching a specified threshold level of IOPS.

In some embodiments, the MPIO driver 112-1 is configured to throttle application IOs when permissible limits on all available ports reach an upper threshold, thereby avoiding IO bursts that might otherwise occur in that situation.

Additionally or alternatively, the frequency at which per-port availability information or other similar types of information is obtained from the storage array 105 can also be fine-tuned based on a threshold reported from the storage array 105. For example, a periodic frequency can be increased so as to ensure that the obtained information is more deterministic of available port resources.

A wide variety of other per-port IO operation limiting arrangements can be implemented using the obtained information. More particular examples of the above limiting arrangements will be described elsewhere herein. Other types of limiting arrangements can be used in other embodiments.

These and other functions related to IO control using detected storage port resource availability that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to obtain, store and utilize per-port availability information or other related information for IO control purposes are intended to be broadly construed, and should not be viewed as being limited to any particular storage arrangement, such as storage in a particular host device component or using a particular format. Accordingly, such storage can be in a memory or other storage device that is outside of the MPIO driver.

It is also to be appreciated that the term "per-port availability information" as used herein is intended to be broadly construed, as so to encompass a wide variety of different types of stored information and associated storage arrangements for per-port availability information of a storage array or other storage system.

As indicated previously, absent use of the techniques for IO control using detected storage port resource availability in a multi-path layer as disclosed herein, performance of the storage system in processing IO requests received from a host device can be adversely impacted by unexpected and potentially extreme spikes in received IO operations, also referred to herein as IO bursts, at one or more ports. Such IO bursts generated by one or more host devices sharing a storage system can not only cause significant performance degradations in the storage system, but can also adversely impact important functions of the host devices such as load balancing and failover policy execution.

Such drawbacks are advantageously overcome in illustrative embodiments herein by utilization of a multi-path layer comprising one or more of the MPIO drivers 112 to provide IO control using detected storage port resource availability as described above. These embodiments therefore provide a significant advance over conventional techniques that do not take detected storage port availability into account in path selection. For example, illustrative embodiments are advantageously configured to avoid IO bursts at storage array ports, thereby allowing the host devices to provide improved load balancing and failover policy execution, leading to enhanced overall performance.

The above-described functions associated with IO control using detected storage port resource availability in the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for IO control using detected storage port resource availability.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support IO control using detected storage port resource availability.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. patent application Ser. No. 15/849,828, filed Dec. 21, 2017 and entitled "Storage System with Input-Output Performance Control Utilizing Application Process Detection," now issued as U.S. Pat. No. 10,474,367, which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements.

Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
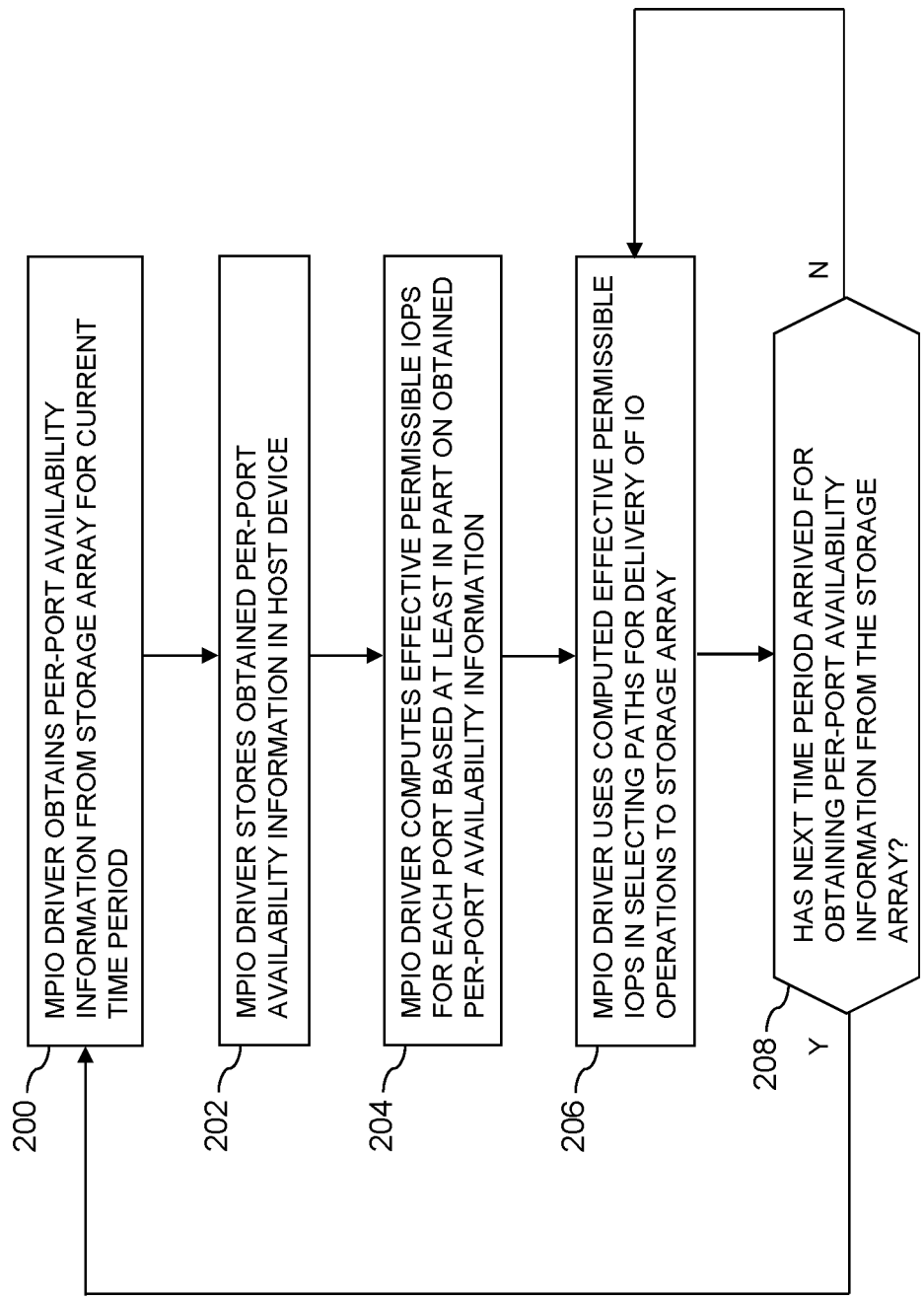
FIG. 2 is a flow diagram of a process for IO control using detected storage port resource availability in a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, the MPIO driver obtains per-port availability information from the storage array for a current time period.

In step 202, the MPIO driver stores the obtained per-port availability information in the host device.

In step 204, the MPIO driver computes effective permissible IOPS for each port of the storage array based at least in part on the obtained per-port availability information.

In step 206, the MPIO driver uses the computed effective permissible TOPS in selecting paths for delivery of IO operations to the storage array. A given such IO operation is illustratively generated by a process of an application running on the host device, and is queued in a given one of the IO queues of the host device with other operations generated by other processes of that application, and possibly other processes of other applications, for port resource availability based IO control as disclosed herein.

In step 208, a determination is made as to whether or not the next time period has arrived for obtaining per-port availability information from the storage array. If the next time period for obtaining per-port availability information has arrived, the process returns to step 200 as indicated in order to obtain that information from the storage array. Otherwise, the process returns to step 206 to continue to process IO operations for delivery to the storage array, using the computed effective permissible TOPS in selecting paths for delivery of the IO operations, in the manner previously described.

Multiple additional instances of the FIG. 2 process may be performed in respective additional host devices that share the storage array. Other embodiments can include multiple storage arrays, with the disclosed functionality for IO control using detected storage port resource availability being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for IO control using detected storage port resource availability. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different port resource availability based IO control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
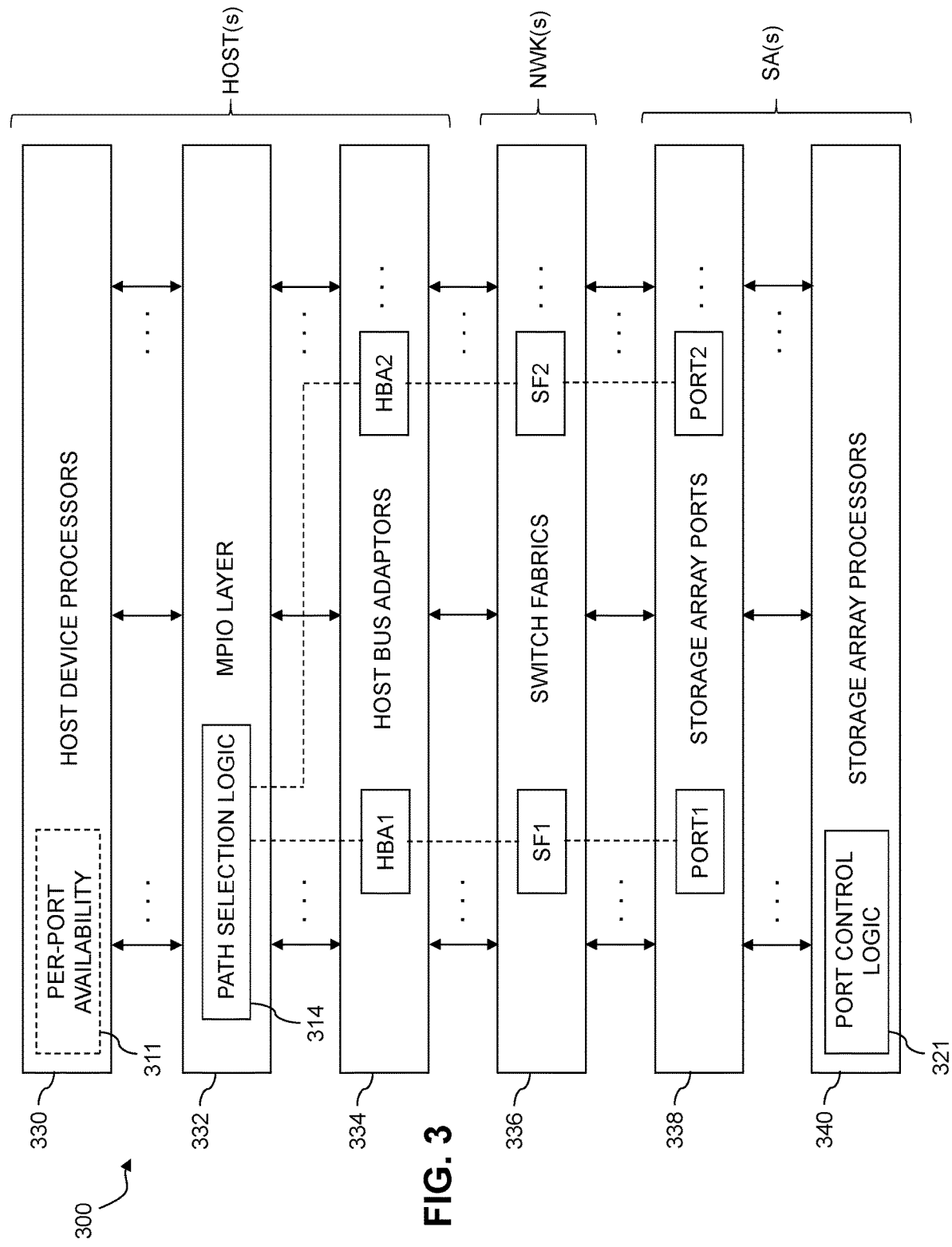
FIG. 3 is a block diagram showing multiple layers of a layered system architecture that includes a multi-path layer with functionality for IO control using detected storage port resource availability in an illustrative embodiment.

Referring now to FIG. 3, another illustrative embodiment is shown. In this embodiment, an information processing system 300 comprises one or more instances of per-port availability information 311, path selection logic 314 and port control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements IO control using detected storage port resource availability as characterized by stored per-port availability information 311. The per-port availability information 311 is illustratively shown as part of one or more host device processors of the host device processor layer 330. Again, a wide variety of other per-port availability storage arrangements are possible, and the per-port availability information 311 is therefore shown in dashed outline in the figure. For example, the per-port availability information 311 in other embodiments is illustratively stored entirely in the MPIO layer 332. It is therefore possible in some embodiments that the per-port availability information 311 can be stored utilizing a component of the MPIO layer 332, such as within a data structure of the path selection logic 314. The per-port availability information 311 illustratively comprises or is otherwise determined at least in part using information obtained from a storage system for use in providing IO control in the manner disclosed herein. For example, the per-port availability information 311 illustratively comprises information obtained by a host device, such as per-port availability information 122 read from the storage array 105, possibly supplemented with additional information computed by the host device.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for IO control using detected storage port resource availability substantially as previously described. Additional or alternative layers and path selection logic arrangements can be used in other embodiments.

The port control logic 321 implemented in the storage array processor layer 340 controls the configuration and operation of ports of one or more storage arrays. For example, the port control logic 321 can include functionality for allocating available resources among a plurality of ports of a given storage array of the system 300. It is also possible in some embodiments that the port control logic 321 can include multiple distinct port control logic instances for multiple sets of ports of respective ones of a plurality of storage arrays of the system 300. Such port control logic instances can be used, for example, to collect per-port availability information within one or more storage arrays and to make such information available to one or more host devices for use in IO control.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths, the path selection logic 314 illustratively limits amounts of IO operations that are delivered over one or more paths to particular ones of the ports of a storage array.

It is assumed in this embodiment that the host devices through their respective MPIO drivers and respective instances of path selection logic 314 provide functionality for IO control using detected storage port resource availability, possibly with involvement of other host device components.

Accordingly, the path selection logic 314 utilizes the per-port availability information 311 in determining appropriate paths over which to send particular IO operations to ports of one or more storage arrays. As described elsewhere herein, such IO control using detected storage port resource availability can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed port resource availability based IO control functionality, under the control of a corresponding instance of path selection logic implemented in the MPIO driver, possibly with involvement of one or more other host device components.

FIG. 4 shows an example of per-port availability information 400 maintained by a storage array in an illustrative embodiment. The per-port availability information 400 in this embodiment is maintained in the form of a table, although other types of data structures can be used in other embodiments. Such information is requested from or otherwise obtained from the storage array by one or more host devices, and may comprise per-port availability information 122 of storage array 105.

The per-port availability information 400 is illustratively obtained from the storage array 105 by a multi-path layer of one or more of the host devices 102. The per-port availability information 400 in this embodiment comprises a plurality of entries for different ones of the ports of the storage array 105, with each such entry comprising a port identifier, a number of hosts connected to that port, and available IOPS for the port. The ports are denoted in the figure as Port 1, Port 2, . . . Port K, and have their respective identifiers in a first column of the table of FIG. 4. Numerous other types and arrangements of entries and fields can be used, and the term "per-port availability information" as used herein is therefore intended to be broadly construed. Such information once obtained from the storage array 105 by a host device, can be stored in a data structure of a multi-path layer of the host device and/or in other data structures elsewhere in the host device.

Another additional embodiment implements an algorithm that is illustratively performed by the path selection logic of the MPIO driver, possibly in cooperation with other host device components. Such an embodiment can be configured, for example, to proportionally distribute host IO operations to connected ports in accordance with their respective available resources, and in addition can illustratively scale such distribution of IO operations within the limits of the available resources. The MPIO driver in this embodiment is illustratively part of a closed-loop feedback mechanism between the storage array and the host device for implementing the proportional distribution of host IO operations.

It is assumed in some embodiments that the MPIO driver of the host device has already determined the port arrangements of the storage array by interacting with the storage array using standard storage protocol commands or other similar arrangements. Such information is illustratively stored in a data structure of a kernel-space portion of the MPIO driver. The multi-path layer is also aware of the number and type of IOs received and the byte counts and other relevant parameters of those IO operations.

In an initialization phase of the algorithm, the following parameters are set, possibly using established defaults:

1. A first time period T (e.g., T=180 sec) defining periods in which the host device will obtain per-port availability information from the storage array and determine corresponding effective permissible TOPS per port.

2. A second time period P (e.g., P=60 sec, such that T is an integer multiple of P) defining periods in which the host device will determine actual TOPS per port to be evaluated against the effective permissible TOPS per port.

3. A host high-water mark level L of IOPS. The host device uses L to calibrate P by, for example, automatically reducing P if L is reached.

4. A host rate-limiting factor F (e.g., a percentage value) used in computing the effective permissible IOPS per port.

The above-noted values T, P, L and F may be user configurable within specified design limits. As noted above, default values may be used in some embodiments in place of explicit individualized user settings.

In an operating phase of the algorithm, the host device periodically obtains per-port availability information from the storage array in accordance with the first time period T, using in-band or out-of-band techniques described elsewhere herein. The information obtained from the storage array responsive to such a request includes the following for each of the ports:

1. Number H of host devices connected to the port.

2. Additional IOPS Ap that the port can handle, based on current IOPS Cp that the port is handling. Ap is an example of what is more generally referred to herein as a "current available capacity measure" of the port. It can be determined at least in part using an incoming IO rate of the port and additional information such as the service rate of a corresponding IO queue in the storage array.

Utilizing the obtained information described above, the host device further performs the following operations as part of the operating phase of the algorithm:

1. Divide the available IOPS Ap for the port by the number H of host devices connected to the port in order to obtain available TOPS per host for the port (i.e., Ahp=Ap/Hn).

2. Compute the effective permissible IOPS Ehp for the port by applying the host device rate-limiting factor F (e.g., 80%) to Ahp (i.e., Ehp=Ahp*80/100). Different rate-limiting factors are illustratively used for different host devices in order to facilitate enforcement of priority for IO operations on a per-host basis.

3. For each time period P, compute actual TOPS for the port and compare it to Ehp.

4. Limit the amount of IO operations delivered over one or more paths to the port based on a result of the comparison, for example, by selecting paths to the port for delivery of IO operations only if the actual IOPS for the port is less than Ehp.

If there is no port for which the actual IOPS for the port is less than Ehp, the host device will throttle the application IOs so as to prevent IO bursts. The host device will continue to monitor the per-port availability information as described above in order to determine when normal IO activity can be resumed within the permitted limits.

In the above algorithm, the available IOPS of a given port is illustratively shared by its connected host devices equally or based on priority as reflected in their distinct rate-limiting factors.

In some embodiments, the host device is configured to perform load balancing of IO operations to available ports based on their respective resource availabilities as described herein. For example, a best effort may be made to select a port having more available resources than another port for the corresponding host device. In the event that the permissible limits of all of the ports available to the host device are at or above a designated upper threshold, application IOs can be throttled accordingly until the situation is alleviated, thereby avoiding IO bursts that might otherwise arise.

The particular features and functionality of the illustrative embodiments described above can be varied in other embodiments.

Also, as mentioned previously, different instances of the above-described algorithms and other port resource availability based IO control techniques can be performed by different MPIO drivers in different host devices.

The particular port resource availability based IO control arrangements described above are therefore presented by way of illustrative example only. Numerous alternative arrangements of these and other features can be used in implementing the port resource availability based IO control in other illustrative embodiments.

The illustrative embodiments disclosed herein can provide a number of significant advantages relative to conventional arrangements.

For example, some embodiments configure a multi-path layer of one or more host devices to include functionality for IO control using detected storage port resource availability that provides improved load balancing and failover policy execution, leading to enhanced overall performance.

Illustrative embodiments can advantageously avoid IO bursts at ports of a storage array or other type of storage system.

For example, some embodiments configure an MPIO driver to throttle application IOs when permissible limits on all available ports reach an upper threshold, thereby avoiding IO bursts that might otherwise occur in that situation.

Additionally or alternatively, the frequency at which per-port availability information or other similar types of information is obtained from a storage system can also be fine-tuned based on a threshold reported from the storage system. For example, a periodic frequency can be increased so as to ensure that the obtained information is more deterministic of available port resources.

These and other illustrative embodiments implement a multi-path layer configured with per-port IO operation limiting arrangements that advantageously avoid IO bursts, leading to improved performance.

Accordingly, some embodiments leverage a multi-path layer of one or more host devices to provide enhanced performance in processing of IO operations directed to one or more storage arrays or other types of storage systems.

These and other arrangements are advantageously configured to provide efficient port resource availability based IO control even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated port resource availability based IO control arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device configured to communicate over a network with a storage system comprising a plurality of storage devices;
   the host device comprising:
   a multi-path input-output driver configured to control delivery of input-output operations from the host device to ports of the storage system over selected ones of a plurality of paths through the network;
   wherein the multi-path input-output driver is further configured, for each of at least a subset of the ports of the storage system:
   to obtain from the storage system information characterizing a current number of host devices connected to the port of the storage system and a current available capacity measure of the port of the storage system; and
   to limit an amount of the input-output operations that are delivered over one or more of the paths to the port of the storage system based at least in part on the obtained information;
   wherein the obtained information characterizing a current number of host devices connected to the port of the storage system and a current available capacity measure of the port of the storage system identifies the current number of host devices connected to the port of the storage system;
   wherein obtaining from the storage system information characterizing a current number of host devices connected to the port and a current available capacity measure of the port comprises obtaining for a given one of a plurality of time periods the current number of host devices and the current available capacity measure for the given time period from a per-port availability data structure maintained by the storage system over the plurality of time periods; and
   wherein the information obtained from the storage system characterizing the current number of host devices connected to the port and the current available capacity measure of the port is stored in a data structure of a kernel-space portion of the multi-path input-output driver.

2. The apparatus of claim 1 further comprising one or more additional host devices each configured to communicate over the network with the storage system and wherein each additional host device comprises a multi-path input-output driver configured to control delivery of input-output operations from that host device to ports of the storage system over selected ones of a plurality of paths through the network.

3. The apparatus of claim 1 wherein the paths are associated with respective initiator-target pairs with each of a plurality of initiators of the initiator-target pairs comprising a corresponding host bus adaptor of the host device and each of a plurality of targets of the initiator-target pairs comprising a corresponding one of the ports of the storage system.

4. The apparatus of claim 1 wherein the current available capacity measure of the port comprises additional input-output operations per second supportable by the port beyond actual input-output operations per second already being supported by the port.

5. The apparatus of claim 1 wherein the current available capacity measure of the port is dynamically determined by the storage system based at least in part on actual processing of input-output operations arriving at that port.

6. The apparatus of claim 1 wherein the information characterizing a current number of host devices connected to the port and a current available capacity measure of the port is obtained by the host device from the storage system utilizing at least one of:

an in-band communication mechanism in which one or more commands in a designated storage protocol are sent from the host device to the storage system; and an out-of-band communication mechanism in which host management software of the host device communicates with storage system management software of the storage system over an Internet Protocol (IP) network connection.

7. The apparatus of claim 1 wherein obtaining from the storage system information characterizing a current number of host devices connected to the port and a current available capacity measure of the port comprises:

establishing a first time period; and repeating the obtaining in each of a plurality of successive instances of the first time period so as to repeatedly obtain from the storage system for each such instance the information characterizing a current number of host devices connected to the port and a current available capacity measure of the port.

8. The apparatus of claim 1 wherein limiting an amount of the input-output operations that are delivered over one or more of the paths to the port based at least in part on the obtained information comprises:

computing effective permissible input-output operations per second for the port based at least in part on the current number of host devices connected to the port and the current available capacity measure of the port; and limiting the amount of the input-output operations that are delivered over one or more of the paths to the port based at least in part on the effective permissible input-output operations per second for the port.

9. An apparatus comprising:

a host device configured to communicate over a network with a storage system comprising a plurality of storage devices;

the host device comprising:

a multi-path input-output driver configured to control delivery of input-output operations from the host device to ports of the storage system over selected ones of a plurality of paths through the network;

wherein the multi-path input-output driver is further configured, for each of at least a subset of the ports of the storage system:

to obtain from the storage system information characterizing a current number of host devices connected to the port of the storage system and a current available capacity measure of the port of the storage system; and to limit an amount of the input-output operations that are delivered over one or more of the paths to the port of the storage system based at least in part on the obtained information;

wherein the obtained information characterizing a current number of host devices connected to the port of the storage system and a current available capacity measure of the port of the storage system identifies the current number of host devices connected to the port of the storage system;

wherein obtaining from the storage system information characterizing a current number of host devices connected to the port and a current available capacity measure of the port comprises obtaining for a given one of a plurality of time periods the current number of host devices and the current available capacity measure for the given time period from a per-port availability data structure maintained by the storage system over the plurality of time periods;

wherein limiting an amount of the input-output operations that are delivered over one or more of the paths to the port based at least in part on the obtained information comprises:

computing effective permissible input-output operations per second for the port based at least in part on the current number of host devices connected to the port and the current available capacity measure of the port; and limiting the amount of the input-output operations that are delivered over one or more of the paths to the port based at least in part on the effective permissible input-output operations per second for the port; and wherein the effective permissible input-output operations per second for the port is computed as a function of a rate-limiting factor of the host device and a ratio of the current available capacity measure of the port and the current number of host devices connected to the port.

10. The apparatus of claim 9 wherein different rate-limiting factors are utilized by different ones of a plurality of host devices configured to communicate over the network with the storage system in computing their respective effective permissible input-output operations per second for the port.

11. An apparatus comprising:

a host device configured to communicate over a network with a storage system comprising a plurality of storage devices;

the host device comprising:

a multi-path input-output driver configured to control delivery of input-output operations from the host device to ports of the storage system over selected ones of a plurality of paths through the network;

wherein the multi-path input-output driver is further configured, for each of at least a subset of the ports of the storage system:

to obtain from the storage system information characterizing a current number of host devices connected to the port of the storage system and a current available capacity measure of the port of the storage system; and to limit an amount of the input-output operations that are delivered over one or more of the paths to the port of the storage system based at least in part on the obtained information;

wherein the obtained information characterizing a current number of host devices connected to the port of the storage system and a current available capacity measure of the port of the storage system identifies the current number of host devices connected to the port of the storage system;

wherein obtaining from the storage system information characterizing a current number of host devices connected to the port and a current available capacity measure of the port comprises obtaining for a given one of a plurality of time periods the current number of host devices and the current available capacity measure for the given time period from a per-port availability data structure maintained by the storage system over the plurality of time periods;

wherein obtaining from the storage system information characterizing a current number of host devices connected to the port and a current available capacity measure of the port comprises:

establishing a first time period; and repeating the obtaining in each of a plurality of successive instances of the first time period so as to repeatedly obtain from the storage system for each such instance the information characterizing a current number of host devices connected to the port and a current available capacity measure of the port; and wherein limiting an amount of the input-output operations that are delivered over one or more of the paths to the port based at least in part on the obtained information comprises:

establishing a second time period having a duration less than that of the first time period;

computing actual input-output operations per second for the port for a given instance of the second time period;

comparing the actual input-output operations per second for the port to effective permissible input-output operations per second for the port computed using the obtained information for a corresponding instance of the first time period; and limiting the amount of the input-output operations that are delivered over one or more of the paths to the port based at least in part on a result of the comparing.

12. The apparatus of claim 11 wherein the first time period has a duration that is an integer multiple of the duration of the second time period.

13. The apparatus of claim 11 wherein the duration of the second time period is reduced responsive to the actual input-output operations per second for the port reaching a specified threshold level of input-output operations per second.

14. A method comprising:

configuring a multi-path input-output driver of a host device to control delivery of input-output operations from the host device to ports of a storage system over selected ones of a plurality of paths through a network;

the multi-path input-output driver, for each of at least a subset of the ports of the storage system:

obtaining from the storage system information characterizing a current number of host devices connected to the port of the storage system and a current available capacity measure of the port of the storage system; and limiting an amount of the input-output operations that are delivered over one or more of the paths to the port of the storage system based at least in part on the obtained information;

wherein the obtained information characterizing a current number of host devices connected to the port of the storage system and a current available capacity measure of the port of the storage system identifies the current number of host devices connected to the port of the storage system;

wherein obtaining from the storage system information characterizing a current number of host devices connected to the port and a current available capacity measure of the port comprises obtaining for a given one of a plurality of time periods the current number of host devices and the current available capacity measure for the given time period from a per-port availability data structure maintained by the storage system over the plurality of time periods; and wherein the information obtained from the storage system characterizing the current number of host devices connected to the port and the current available capacity measure of the port is stored in a data structure of a kernel-space portion of the multi-path input-output driver.

15. The method of claim 14 wherein obtaining from the storage system information characterizing a current number of host devices connected to the port and a current available capacity measure of the port comprises:

establishing a first time period; and repeating the obtaining in each of a plurality of successive instances of the first time period so as to repeatedly obtain from the storage system for each such instance the information characterizing a current number of host devices connected to the port and a current available capacity measure of the port.

16. The method of claim 14 wherein limiting an amount of the input-output operations that are delivered over one or more of the paths to the port based at least in part on the obtained information comprises:

computing effective permissible input-output operations per second for the port based at least in part on the current number of host devices connected to the port and the current available capacity measure of the port; and limiting the amount of the input-output operations that are delivered over one or more of the paths to the port based at least in part on the effective permissible input-output operations per second for the port.

17. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:

to control delivery of input-output operations from the host device to ports of the storage system over selected ones of a plurality of paths through the network; and for each of at least a subset of the ports of the storage system:

to obtain from the storage system information characterizing a current number of host devices connected to the port of the storage system and a current available capacity measure of the port of the storage system; and to limit an amount of the input-output operations that are delivered over one or more of the paths to the port of the storage system based at least in part on the obtained information;

wherein the obtained information characterizing a current number of host devices connected to the port of the storage system and a current available capacity measure of the port of the storage system identifies the current number of host devices connected to the port of the storage system;

wherein obtaining from the storage system information characterizing a current number of host devices connected to the port and a current available capacity measure of the port comprises obtaining for a given one of a plurality of time periods the current number of host devices and the current available capacity measure for the given time period from a per-port availability data structure maintained by the storage system over the plurality of time periods; and wherein the information obtained from the storage system characterizing the current number of host devices connected to the port and the current available capacity measure of the port is stored in a data structure of a kernel-space portion of the multi-path input-output driver.

18. The computer program product of claim 17 wherein obtaining from the storage system information characterizing a current number of host devices connected to the port and a current available capacity measure of the port comprises:
- establishing a first time period; and
- repeating the obtaining in each of a plurality of successive instances of the first time period so as to repeatedly obtain from the storage system for each such instance the information characterizing a current number of host devices connected to the port and a current available capacity measure of the port.

19. The computer program product of claim 17 wherein limiting an amount of the input-output operations that are delivered over one or more of the paths to the port based at least in part on the obtained information comprises:
- computing effective permissible input-output operations per second for the port based at least in part on the current number of host devices connected to the port and the current available capacity measure of the port; and
- limiting the amount of the input-output operations that are delivered over one or more of the paths to the port based at least in part on the effective permissible input-output operations per second for the port.

20. The computer program product of claim 19 wherein the effective permissible input-output operations per second for the port is computed as a function of a rate-limiting factor of the host device and a ratio of the current available capacity measure of the port and the current number of host devices connected to the port.

* * * * *